(12) United States Patent  
Nguyen-Misra et al.

(10) Patent No.: US 6,803,412 B2  
(45) Date of Patent: Oct. 12, 2004

(54) MOISTURE CURABLE HOT MELT SEALANTS FOR GLASS CONSTRUCTIONS

(75) Inventors: Mai T. Nguyen-Misra, Shoreview, MN (US); Margarita Acevedo, Minneapolis, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 10/386,823

(22) Filed: Mar. 13, 2003

(65) Prior Publication Data

US 2004/0180155 A1 Sep. 16, 2004

(51) Int. Cl.⁷ .............................................. C08G 18/61
(52) U.S. Cl. ..................... 525/102; 525/127; 525/128; 525/131
(58) Field of Search ............................... 525/127, 128, 525/131, 102

(56) References Cited

U.S. PATENT DOCUMENTS

| | | | |
|---|---|---|---|
| 3,632,557 A | 1/1972 | Brode et al. | |
| 3,979,344 A | 9/1976 | Bryant et al. | 260/18 |
| 4,098,772 A | 7/1978 | Bonk et al. | 528/49 |
| 4,622,249 A | 11/1986 | Bowser | 428/34 |
| 4,625,012 A | 11/1986 | Rizk et al. | 528/28 |
| 4,645,816 A | 2/1987 | Pohl et al. | 528/28 |
| 4,687,533 A | 8/1987 | Rizk et al. | 156/307.3 |
| 4,798,878 A | 1/1989 | Brinkmann et al. | 528/28 |
| 4,808,255 A | 2/1989 | Markevka et al. | 156/307.3 |
| 4,820,368 A | 4/1989 | Markevka et al. | |
| 4,891,269 A | 1/1990 | Markevka et al. | 428/423 |
| 4,960,844 A | 10/1990 | Singh | 528/17 |
| 4,965,117 A | 10/1990 | Lautenschlaeger et al. | 428/182 |
| 5,155,180 A | 10/1992 | Takada et al. | 525/440 |
| 5,225,512 A | 7/1993 | Baghdachi et al. | 528/28 |
| 5,389,170 A | 2/1995 | Brady et al. | 156/109 |
| 5,391,610 A | 2/1995 | Comert et al. | 524/507 |
| 5,472,785 A | 12/1995 | Stobbie, IV et al. | 428/423.1 |
| 5,525,654 A | 6/1996 | Podola et al. | 524/199 |
| 5,554,709 A | 9/1996 | Emmerling et al. | 528/27 |
| 5,631,318 A | 5/1997 | Ito et al. | 524/590 |
| 5,760,155 A | 6/1998 | Mowrer et al. | 528/28 |
| 5,849,832 A | 12/1998 | Virnelson | 524/512 |
| 5,855,972 A | 1/1999 | Kaeding | 428/34 |
| 5,863,857 A | 1/1999 | Lamb et al. | 502/402 |
| 5,866,651 A | 2/1999 | Moren et al. | 524/588 |
| 5,939,499 A | 8/1999 | Anderson et al. | 525/440 |
| 5,990,257 A | 11/1999 | Johnston et al. | 528/28 |
| 6,001,946 A | 12/1999 | Waldman et al. | 528/28 |
| 6,015,475 A | 1/2000 | Hsieh et al. | 156/331.4 |
| 6,121,354 A | 9/2000 | Chronister | 524/262 |
| 6,197,912 B1 | 3/2001 | Huang et al. | 528/28 |
| 6,245,145 B1 | 6/2001 | Lisec | |
| 6,265,517 B1 | 7/2001 | Stuart | 528/28 |
| 6,310,170 B1 | 10/2001 | Johnston et al. | 528/38 |
| 6,329,488 B1 | 12/2001 | Terry et al. | 528/28 |
| 6,355,317 B1 | 3/2002 | Reid et al. | 428/34 |
| 6,420,320 B1 | 7/2002 | McGraw et al. | 508/223 |
| 6,433,124 B1 | 8/2002 | Bruchmann et al. | 524/49 |
| 6,498,210 B1 | 12/2002 | Wang et al. | 524/588 |
| 6,512,033 B1 | 1/2003 | Wu | 524/128 |
| 6,613,836 B2 * | 9/2003 | Rumack | 524/589 |
| 2004/0059069 A1 | 3/2004 | Grimm et al. | |

FOREIGN PATENT DOCUMENTS

| | | |
|---|---|---|
| CA | 2258585 | 1/1998 |
| DE | 19624236 | 1/1998 |
| EP | 0 646 632 A1 | 4/1995 |
| EP | 0 776 956 A2 | 6/1997 |
| EP | 0 852 280 B1 | 7/1998 |
| EP | 0 776 956 A3 | 8/1998 |
| EP | 1 052 362 A2 | 11/2000 |
| JP | 61187369 | 2/1988 |
| WO | WO 98/53008 | 11/1998 |
| WO | WO 01/05846 | 1/2001 |

* cited by examiner

*Primary Examiner*—Rachel Gorr

(57) ABSTRACT

A moisture curable hot melt sealant composition that includes polyurethane prepolymer having at least one of isocyanate functional groups and silane functional groups, reactive plasticizer capable of reacting with at least one of the polyurethane prepolymer and itself, and thermoplastic polymer.

42 Claims, No Drawings

MOISTURE CURABLE HOT MELT SEALANTS FOR GLASS CONSTRUCTIONS

BACKGROUND

The invention relates to moisture curable hot melt sealants.

Insulating glass assemblies such as insulating glass units and insulating sash assemblies often include a pair of glass sheets maintained in a fixed spaced relation to each other by a spacing and sealing structure that extends around the periphery of the inner facing surfaces of the glass sheets to define a sealed and insulating space between the glass sheets. In the case of insulating sash assemblies, the glass panes are adhered to a frame. The glass sheets are usually attached to the structure by a sealant or adhesive composition. The sealant or adhesive composition is also used to seal the edges of the insulating sash assembly so as to establish a barrier that prevents moisture from penetrating into the interior of the assembly. Insulating sash assemblies are described, e.g., in U.S. Pat. No. 6,286,288.

Sealant compositions are also used to bond an insulating glass assembly, e.g., an insulating glass unit, to a frame. This process is often referred to as "back bedding." Back bedding is discussed in, e.g., U.S. Pat. Nos. 6,286,288 and 5,856,404 and incorporated herein. In the fabrication of door and window units back bedding sealants are often used to seal and bond panes of glass and insulating glass units to retain the pane or the unit in position within a frame, to provide a weather proof seal, to reinforce the structural strength of the assembly, or a combination thereof.

Variables that arise in bonding two substrates of different materials, such as bonding a glass substrate to a polymer substrate, include the different coefficients of thermal expansion and contraction associated with the two materials. The differences in these coefficients can cause stresses to be exerted on one or more of the substrates when the assembly experiences a change in temperature, which can torque polymer substrates and cause fractures in glass substrates.

Two common classes of sealants used in the insulating glass industry include chemically curing, thermoset compositions, and thermoplastic, one-part hot melt butyl-type compositions. Chemically curing systems often include liquid polysulphides, polyurethanes, mercaptan-modified polyether polyurethanes and silicones. Thermoplastic compositions, which are also referred to as "non-curing systems," are often polyisobutylene-polyisoprene copolymer rubber-based hot melt compositions.

Chemical curing thermoset sealants are usually two-component systems in which the components are combined, at room temperature, just prior to application. The sealants have low initial green strength and require cure time prior to handling. The slow cure can increase manufacturing time and costs.

Non-curing hot melt systems generally set faster and can overcome the disadvantage of having a slow cure time, but hot melts are more susceptible to fluctuations in ambient temperature and may soften with high temperatures or stiffen with cold and do not develop as high ultimate bond strengths in comparison to curing systems. When insulating glass assemblies constructed with thermoplastic sealants are placed under load and temperature, the thermoplastic sealant may flow or deform to relieve the load. In addition, thermoplastic sealants are often applied at very high temperatures, e.g., in excess of 300° F.

Other sealant compositions that have been developed include a one part sealant that includes thermoplastic hot melt resin and an atmosphere curing resin capable of polymerizing upon exposure to ambient atmosphere.

SUMMARY

In one aspect, the invention features a moisture curable hot melt sealant composition that includes a polyurethane prepolymer having isocyanate functional groups, silane functional groups, or a combination thereof, a reactive plasticizer capable of reacting with at least one of the polyurethane prepolymer and itself, and thermoplastic polymer.

In one embodiment, the polyurethane prepolymer includes silane functional groups. In other embodiments the polyurethane prepolymer includes isocyanate functional groups.

In some embodiments, the composition includes from about 5% by weight to about 50% by weight the polyurethane prepolymer, from no greater than 20% by weight the reactive plasticizer, and from about 5% by weight to about 80% by weight the thermoplastic polymer. In other embodiments, the composition includes from about 10% by weight to about 40% by weight the polyurethane prepolymer, from about 2% by weight to about 15% by weight the reactive plasticizer, and from about 10% by weight to about 70% by weight the thermoplastic polymer. In another embodiment, the sealant includes from about 15% by weight to about 35% by weight the polyurethane prepolymer, from about 3% by weight to about 10% by weight the reactive plasticizer, and from about 15% by weight to about 60% by weight the thermoplastic polymer.

In one embodiment, the reactive plasticizer has a molecular weight of from about 300 g/mole to about 10,000 g/mole. In other embodiments, the reactive plasticizer has a molecular weight of from about 500 g/mole to about 6,000 g/mole.

In some embodiments, the polyurethane prepolymer includes the reaction product of polyester polyol, polyisocyanate; and monofunctional alcohol.

In one embodiment, the polyurethane prepolymer includes the reaction product of polyester polyol, polyisocyanate, monofunctional alcohol and hydrogen active organofunctional silane.

In some embodiments, the hydrogen active organofunctional silane includes amino-alkoxysilane, mercapto-alkoxysilane, or a combination thereof.

In another embodiment, the hydrogen active organofunctional silane includes N-methyl-3-amino-2-methylpropyltrimethoxysilane, N-ethyl-3-amino-2-methylpropyltrimethoxysilane, N-ethyl-3-amino-2-methylpropyldiethoxysilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy)propyltrimethoxysilane, N-ethyl-4-amino-3,3-dimethylbutyidimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N-(n-butyl)aminopropyltrimethoxysilane, or a combination thereof.

In one embodiment, the monofunctional alcohol has from 12 to 20 carbon atoms.

In some embodiments, the reactive plasticizer includes silyl-terminated polyether. In other embodiments, the reactive plasticizer includes alkoxysilyl reactive groups. In another embodiment, the reactive plasticizer is selected from the group consisting of aldimines, ketimines, oxazolidines, dioxolanes, and combinations thereof.

In another embodiment, the composition exhibits an initial lap shear of at least 10 psi. In some embodiments, the composition exhibits an open time of at least 60 seconds. In other embodiments, the composition exhibits a softening temperature of no greater than 50° C.

In another embodiment, the sealant composition has a glass transition temperature of less than –5° C. In one embodiment, the sealant composition has a glass transition temperature of less than –25° C. In some embodiments, the composition exhibits a viscosity of from about 150,000 centipoise to about 400,000 centipoise at 230° F. In other embodiments, the composition exhibits a lap shear of at least 80 psi after three weeks at 23° C. and 50% relative humidity.

In other embodiments, the composition, after cure, exhibits an elongation of at least 200%.

In one embodiment, the composition, after cure, exhibits a tensile strength of at least 100 psi. In some embodiments, the composition, after cure, exhibits a modulus at 100% elongation of no greater than 300 psi. In another embodiment, the composition, when in the form of a cured 60 mil film, exhibits a moisture vapor transmission rate no greater than 10 g/m$^2$/day.

In other embodiments, the composition further includes at least one of tackifying agent, non-reactive plasticizer and silane adhesion promoter.

In some embodiments, the thermoplastic polymer includes ethylene vinyl acetate. In other embodiments, the thermoplastic polymer is selected from the group consisting of polyolefins, polyesters, polyacrylates, polymethacrylates, polyacrylamides, polyacrylonitriles, po)yimides, polyamides, copolymers of vinyl alcohol and ethylenically unsaturated monomers, polyvinyl chloride, polysiloxanes, polyurethanes, polystyrene, and combinations thereof. In another embodiment, the thermoplastic polymer includes thermoplastic elastomer selected from the group consisting of polyetheramide copolymers, styrene-butadiene-styrene copolymers, styrene-isoprene-styrene copolymers, styrene-ethylene-butylene-styrene copolymers, styrene-ethylene-propylene-styrene copolymers, butyl rubber, polyisobutylene, and combinations thereof.

In another aspect, the invention features a multipane glass assembly that includes a first glass pane, a second glass pane, a spacer, and a sealant composition including the reaction product of a moisture curable hot melt sealant composition disclosed herein, and thermoplastic polymer, the first glass pane and the second glass pane being bonded to the structural frame through the sealant composition.

In one embodiment the multipane glass assembly includes an insulating glass unit that includes a first glass pane, a second glass pane, a spacer, and a first sealant composition, the first glass pane being bonded to a first surface of the spacer through the first sealant composition, the second glass pane being bonded to a second surface of the spacer through the first sealant composition, a frame and a second sealant composition, the insulating glass unit being bonded to the frame through said second sealant composition, the second sealant composition including a moisture cured sealant composition including the reaction product of a polyurethane prepolymer including isocyanate functional groups, silane functional groups, or a combination thereof, reactive plasticizer capable of reacting with at least one of said, polyurethane prepolymer and itself, and thermoplastic polymer.

In other aspects the invention features a polyurethane prepolymer that includes the reaction product of polyester polyol, polyisocyanate, and monofunctional alkyl alcohol having from 12 to 16 carbon atoms. In one embodiment, the polyol is amorphous. In other embodiments, the polyol has a glass transition temperature less than 0° C. In some embodiments, the polyol is hydrophobic. In another embodiment a moisture curable hot melt sealant composition includes the prepolymer. In one embodiment the sealant composition further includes thermoplastic polymer. In other embodiments, the sealant composition further includes reactive plasticizer.

In still other aspects, the invention features a method of bonding a first substrate to a second substrate, the method including contacting a first substrate with a moisture curable hot melt sealant composition disclosed herein, and contacting the sealant composition with a second substrate. In one embodiment, the first substrate includes at least one of glass and polymer. In other embodiments, the second substrate includes at least one of glass and polymer.

In other aspects, the invention features a method of making an insulating glass assembly, where the method includes contacting a first substrate with a moisture curable hot melt sealant composition disclosed herein and contacting the sealant composition with a second substrate.

In another aspect, the invention features a moisture curable hot melt sealant composition that includes a moisture curable polymer, reactive plasticizer capable of reacting with at least one of said moisture curable polymer and itself, and a thermoplastic polymer.

The invention features a hot melt moisture curable sealant composition that exhibits good adhesion to glass and plastic, i.e., polymer-based substrates, and good moisture barrier properties, i.e., works to prevent or inhibit the penetration of moisture into the chamber sealed thereby. The sealant also exhibits good adhesion retention to glass, plastic and metal substrates under weathering conditions, good flexibility at low temperatures, and good creep resistance (i.e., holding power) at elevated temperatures. The sealant also generates little to no volatile organic compounds and exhibits low modulus, good elastic recovery and an ability to dissipate stress.

The sealant can be applied at relatively low application temperatures while maintaining a useful open time and suitable handling strength.

The invention also features a polyurethane prepolymer that is tacky and exhibits good flexibility, good barrier properties, good water resistance and good ultraviolet light resistance.

Other features and advantages will be apparent from the following description of the preferred embodiments and from the claims.

DETAILED DESCRIPTION

The hot melt moisture curable sealant composition includes moisture curable polymer, reactive plasticizer, and thermoplastic polymer.

The sealant composition preferably exhibits an open time of at least 60 seconds, more preferably at least 90 seconds at the application temperature, an immediate green strength (as measured by initial lap shear) of at least 5 psi, more preferably at least 10 psi, and a final lap shear of at least 50 psi, more preferably at least about 80 psi, most preferably at least 100 psi, when measured at room temperature after conditioning for at least three weeks at 23° C. and 50% relative humidity.

Preferably the sealant is capable of being applied to a substrate at a temperature of less than about 125° C., more preferably no greater than about 110° C. Preferred sealant compositions exhibit a viscosity of from about 150,000 centipoise (cps) to about 400,000 cps, more preferably from about 150,000 cps to about 300,000 cps at 110° C. and a Tg less than −5° C., more preferably less than −25° C. prior to cure.

After cure, the sealant composition preferably exhibits an elongation of at least 200%, more preferably at least 250%, most preferably from about 250% to about 600%, a modulus at 100% elongation of no greater than 300 psi, more preferably from 50 psi to 250 psi, and a tensile strength of at least 100 psi, preferably at least 200 psi. The cured sealant composition also preferably exhibits a hardness of from about 40 Shore A to about 65 Shore A.

The sealant composition preferably provides a moisture barrier and exhibits a moisture vapor transmission rate no greater than 10 g/m²/day, most preferably no greater than 8 g/m²/day when in the form of a film having a thickness of 60 mils.

The moisture curable polymer preferably is a polyurethane prepolymer that includes at least two functional groups capable of reacting with moisture. The functional groups of the polyurethane prepolymer can be isocyanate, silane, or a combination thereof. The functional groups can be located pendant, terminal, or a combination thereof to the polyurethane prepolymer. Preferred polyurethane prepolymers are endcapped with functional groups, e.g., endcapped with isocyanate groups, silane groups or a combination thereof. Preferred polyurethane prepolymers have a number average molecular weight (Mn) of from about 2000 to about 50,000, more preferably from about 2500 to about 20,000, most preferably from about 3000 to about 15,000. The moisture-curable polyurethane prepolyrner preferably is polydisperse, i.e., the ratio of the weight average molecular weight (Mw) to the number average molecular weight (Mn) (i.e., Mw/Mn) is at least 2.1.

The moisture curable polyurethane prepolymer is prepared by reacting polyisocyanate, polyol, optionally monofunctional alcohol and optionally an active hydrogen organofunctional silane. Preferably the polyol is reacted with excess diisocyanate (i.e., the amount of isocyanate functional groups present in the reaction mixture is greater than the number of hydroxy equivalents present in the reaction mixture) in a first step to form an isocyanate functional polyurethane prepolymer. Preferably the ratio of isocyanate groups to hydroxy groups in the reaction mixture is sufficient to obtain an isocyanate concentration in the final prepolymer of from about 1% by weight to about 10% by weight as measured by ASTM D-2572-80. Preferably the ratio of isocyanate groups to hydroxy groups in the reaction mixture is from about 1.1:1 to about 4:1, more preferably from about 1.2:1 to about 2.5:1.

Preferred isocyanate functional polyurethane prepolymers have an average functionality (i.e., average number of functional groups) of at least 2, more preferably at least about 1.8, most preferably at least about 2.0, preferably no greater than about 3.0.

The polyisocyanate can be any suitable isocyanate having at least two isocyanate groups including, e.g., aliphatic, cyclopaliphatic, aralkyl, arylalkyl, alkylaryl, and aromatic isocyanates, and mixtures thereof. Suitable diisocyanates include, e.g., trimethylene diisocyanate, tetramethylene diisocyanate, hexamethylene diisocyanate, pentamethylene diisocyanate, 2,4,4-trimethylhexamethylene diisocyanate, dodecamethylene diisocyanate, 2,2,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylenebis(cyclohexyl isocyanate), methyl 2,4-cyclohexanediisocyanate, methyl 2,6-cyclohexanediisocyanate, 1,4-bis(isocyanatemethyl) cyclohexane, 1,3-bis(isocyanatemethylicyclohexane, m-phenylene diisocyanate, p-phenylene diisocyanate, 4,4'-diphenyl diisocyanate, 1,5-naphthalene diisocyanate, 4,4'-diphenylmethane diisocyanate, diphenylmethane diisocyanate, 2,4-tolylene diisocyanate, 2,6-tolylene diisocyanate, 4,4'-toluidine diisocyanate, dianilidine diisocyanate, 4,4'-diphenyl ether diisocyanate, 1,3-xylylene diisocyanate, 1,4-xylylene diisocyanate, omega,omega'-diisocyanate-1,4-diethylbenzene, methylene bis(4-cyclohexyl isocyanate), tetramethylxylene diisocyanate, toluene diisocyanate, 4,4' methylene diphenyl diisocyanate, blends of 2,4' methylene diphenyl diisocyanate and 4,4' methylene diphenyl diisocyanate, 2',4'-diphenyl methane diisocyanate, and naphthalene-1,5-diisocyanate, and mixtures thereof. Other useful isocyanates are disclosed in, e.g., U.S. Pat. Nos. 6,387,449, 6,355,317, 6,221,978, 4,820,368, 4,808,255, 4,775,719, and 4,352,858, and incorporated herein.

Particularly preferred diisocyanates are blends of 2,4'-methylene diphenyl diisocyanate and 4,4-methylene diphenyl diisocyanate.

Useful commercially available aromatic isocyanates include, e.g., aromatic isocyanates available under the trade designations MONDUR ML from Bayer (Pittsburgh, Pa.), ISONATE 50 OP and ISONATE 125M from Dow Chemical Company (Midland, Mich.), and LUPRANATE MI from BASF (Germany).

Examples of other suitable diisocyanates include 1,2-diisocyanateethane, 1,3-diisocyanatepropane, 1,2-diisocyanatepropane, 1,4-diisocyanatebutane, 1,5-diisocyanatepentane, 1,6-diisocyanatehexane, bis(3-isocyanatepropyl)ether, bis(3-isocyanatepropyl)sulfide, 1,7-diisocyanateheptane, 1,5-diisocyanate-2,2-dimethylpentane, 1,6-diisocyanate-3-methoxyhexane, 1,8-diisocyanatectane, 1,5-diisocyanate-2,2,4-trimethylpentane, 1,9-diisocyanatenonane, 1,10-diisocyanatepropyl ether of 1,4-butylene glycol, 1,11-diisocyanateundecane, 1,12-diisocyanatedodecane, bis(isocyanatehexyl)sulfide, 4-diisocyanatebenze, 1,3-diisocyanate-o-xylene, 1,3-diisocyanate-p-xylene, 1,3-diisocyanate-m-xylene, 2,4-diisocyanate-1-chlorobenzene, 2,4-diisocyanate-1-nitrobenzene, 2,5-diisocyanate-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-cyclohexane diisocyanate, hexahydrotoluene diisocyanate, 1,5-napthalene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-dimethyldiphenylmethane-4,4'-diisocyanate and 3,3'-dimethyidiphenylmethane-4,4'-diisocyanate.

Examples of suitable polyisocyanates include, e.g., triisocyanates, e.g., 4,4',4"-triphenylmethane triisocyanate and 2,4,6-toluene triisocyanate, tetraisocyanates, e.g., 4,4'-dimethyl-2,2'-5,5'-diphenylmethane tetraisocyanate, and polymethylene polyphenylene polyisocyanate.

Suitable polyols useful in the preparation of the prepolymer include, e.g., diols, triols and mixtures thereof. Preferred polyols have a functionality of at least about 1.5, more preferably at least about 1.8, most preferably at least about 2, preferably no greater than 4.0, more preferably no greater than 3.5, most preferably no greater than 3.0. Preferred polyols are amorphous, have a Tg less than 0° C., preferably less than −20° C., and a molecular weight greater than 500 g/mole, more preferably from greater than 500 g/mole to about 10,000 g/mole, most preferably from about 1000 g/mole to about 4000 g/mole. Preferred polyols are hydrophobic, preferably predominantly hydrocarbon in structure.

Useful classes of polyols include, e.g., polyester polyols including, e.g., lactone polyols and the alkyleneoxide adducts thereof, and dimer acid-based polyester polyols, specialty polyols including, e.g., polybutadiene polyols, hydrogenated polybutadiene polyols, polycarbonate polyols, hydroxy alkyl derivatives of bisphenol A (e.g., bis(2-hydroxyethyl) bisphenol A), polythioether polyols, fluorinated polyether polyols, acrylic polyols, alkylene oxide adducts of polyphenols, polytetramethylene glycols, functional glyccrides (e.g., castor oil), and polyhdroxy sulfide polymers.

Useful polyester polyols are prepared from the reaction product of polycarboxylic acids, their anhydrides, their esters or their halides, and a stoichiometric excess polyhydric alcohol. Suitable polycarboxylic acids include dicarboxylic acids and tricarboxylic acids including, e.g., aromatic dicarboxylic acids, anhydrides and esters thereof (e.g. phthalic acid, terephthalic acid, isophthalic acid, dimcthyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, succinic acid, succinic anhydride, glutaric acid, adipic acid, pimelic acid, suberic acid, azelaic acid, sebacic acid, chlorendic acid, 1,2,4-butanc-tricarboxylic acid, decanedicarboxylic acid, octadecanedi-carboxylic acid, dimeric acid, and fumaric acid), and alicyclic dicarboxylic acids (e.g. 1,3-cyclohexanedicarboxylic acid, and 1,4-cyclohexanedicarboxylic acid).

Examples of suitable polyols from which polyester polyols can be derived include ethylene glycols, propane diols (e.g., 1,2-propanediol and 1,3-propanediol), butane diols (e.g., 1,3-butanediol), 1,5-pentanediol, 1,6-hexanediol, 1,8-octanediol, 1,10-decanediol, neopentyl glycol, diethylene glycol, triethylene glycol, tetraethylene glycol, polyethylene glycols, polypropylene glycols (e.g., dipropylene glycol and tripropylene glycol) 1,4-cyclohexanedimethanol, 1,4-cyclohexanediol, dimer diols, bisphenol A, bisphenol F, hydrogenated bisphenol A, and hydrogenated bisphenol F, glycerol, and combinations thereof.

Examples of useful polyester polyols include polyglycol adipates, polyethylene terephthalate polyols, polycaprolactone polyols and polycaprolactone triols.

Suitable commercially available polyols include, e.g., dimer acid-based polyester polyols available under the PRI-PLAST series of trade designations including, e.g., PRI-PLAST 3187, 3190, 3196, and 3197 from UNIQEMA (New Castle, Del.), polybutadiene polyols available under the trade designations POLYBD R-20LM, R-45HT, and R-45M from Atofina Chemicals, Inc. (Exton, Pa.), and hydrogenated polybutadiene polyols available under the trade designation POLYTAIL from Mitsubishi Chemical Corp. (Japan).

Preferred monofunctional alcohols for use in the preparation of the polyurethane prepolymer are amorphous or exhibit a melting point of no greater than 50° C. The monofunctional alcohol is preferably an alkyl alcohol having from 4 to 18 carbon atoms, more preferably from 8 to 16 carbon atoms, most preferably from 12 to 16 carbon atoms, and a molecular weight of from about 74 g/mol to about 1000 g/mol, more preferably from about 130 g/mol to about 500 g/mol. Useful monofunctional alcohols also have an OH number of from about 750 to about 56, preferably from about 430 to about 110.

Suitable monofunctional alcohols include, e.g., alkyl, alkylene, alkynyl, aromatic, heteroaromatic, branched, unbranched, substituted, and unsubstituted alcohols, alkoxylated products of alkyl.alcohols, alkyl ester alcohols and mixtures thereof.

Examples of suitable monofunctional aliphatic alcohols include ambutyl alcohol, isobutyl alcohol, isohexyl alcohol, 1,3'-dimethylbutyl alcohol, hexyl alcohol, heptyl alcohol, octyl alcohol, decyl alcohol, nonyl alcohol, 2-ethylhexyl alcohol, 2-ethyl-1-heptyl alcohol, 2-ethyl-1-octyl alcohol, isooctyl alcohol, oxo alcohol, dodecyl alcohol, undecyl alcohol, tridecyl alcohol, isotridecyl alcohol, tetradecyl alcohol, pentadecyl alcohol, hexadecyl alcohol, isohexyldecyl alcohol, 3,5,5-trimethyl-1-hexyl alcohol, styro alcohol, and behenyl alcohol, alcohols having from 12 to 30 carbon atoms (e.g., oleyl alcohol), alcohol mixtures that are obtained by hydrogenating fatty acid mixtures of from 12 to 30 carbon atoms obtained from natural fats and oils, such as olive oil, grapeseed oil, coconut oil, palm oil, soybean oil, cottonseed oil, and linseed oil, alkyl ester alcohols (e.g., 2,2,4-trimethyl-1,3-pentanediol monoisobutyrate), and combinations thereof. Useful monofunctional alcohols and methods of endcapping monofunctional alcohols for use with prepolymers are also described, e.g., in U.S. Pat. No. 6,498,210 and incorporated herein.

Useful commercially available monofunctional alcohols include the methoxypolyethylene glycols that are commercially available under the CARBOWAX series of trade designations including, e.g., CARBOWAX PMEG 350, 500 and 750, from Dow Chemical Company (Midland, Mich.), and ALFOL C14 1 tetradecanol and ALFOL C18 1-octadecanol both of which are available from Condea Vista Company, Houston, Tex.).

Monofunctional alcohol is preferably present in the reaction mixture in an amount of less than 55 molar %, more preferably less than 50 molar %, most preferably less than 45 molar % based on the molar equivalents of isocyanate.

Useful methods of preparing isocyanate functional polyurethane prepolymers are disclosed in a number of references including, e.g., U.S. Pat. Nos. 6,355,317, 6,387,449, 5,965,662, 4,808,255, 4,775,719, and 4,352,858, and incorporated herein.

The isocyanate functional polyurethane prepolymer may optionally be reacted with a hydrogen active organofunctional silane to form a silane functional polyurethane prepolymer. Preferably the resulting polyurethane is endcapped with at least one silane functional group, and preferably includes no greater than six silane functional groups. Preferred silane functional polyurethane prepolymers have an average functionality in the alkoxy or other atmospheric curing moiety of at least 1.5, more preferably at least about 2, most preferably at least about 2.4.

Silane functional polyurethane prepolymers having pendant or terminal silane functional groups can be prepared by the reaction of a hydrogen active organofunctional silane with an isocyanate terminated prepolymer such as the isocyanate terminated polyurethanes described above. Preferably the isocyanate functional polyurethane prepolymer has an average functionality of at least 0.9, more preferably at least about 1, most preferably at least about 1.1, preferably no greater than about 2.5. A slight excess (e.g., about 3% to 5%) of the hydrogen active organofunctional silane is preferably present to ensure complete-reaction of all the isocyanate groups of the prepolymer. The reaction preferably is conducted in the absence of moisture and at a temperature in the range of from 60° C. to 90° C. The reaction is complete when the percent isocyanate is determined to be zero.

Any hydrogen active organofunctional silane that includes at least one functional group (e.g., hydrogen) that is reactive with an isocyanate group of the polyurethane prepolymer, and at least one silyl group can be used. Examples of useful silyl groups include alkoxysilyls, aryloxysilyls, alkyloxyiminosilyls, oxime silyls, and amino silyls. Preferred hydrogen active organofunctional silanes include, e.g., aminosilanes (e.g., secondary amino-alkoxysilanes and mercapto-alkoxysilanes. Examples of suitable aminosilanes include phenyl amino propyl trimethoxy silane, methyl amino propyl. trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted 4-amino 3,3-dimethyl butyl trimethoxy silane, amino propyl triethoxy silane and mixtures thereof, specific examples of which include N-methyl-3-amino-2-methylpropyltrimethoxysilane, N-ethyl-3-amino-2-methylpropyltrimethoxysilane, N-ethyl-3-amino-2-methylpropyidiethoxysilane, N-ethyl-3-amino-2-methylpropyltriethoxysilane, N-ethyl-3-amino-2-methylpropylmethyidimethoxysilane, N-butyl-3-amino-2-methylpropyltrimethoxysilane, 3-(N-methyl-3-amino-1-methyl-1-ethoxy)propyltrimethoxysilane, N-ethyl-4-amino-3,3-dimethylbutyidimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N,N-bis[(3-triethoxysilyl)propyl]amine, N,N-bis[(3-tripropoxy-silyl)propyl]amine, N-(3-trimethoxysilyl)propyl-3-[N-(3-trimethoxysilyl)-propylamino]propionamide, N-(3-triethoxysilyl)propyl-3-[N-3-triethoxysilyl)-propylamino]propionamide, N-(3-trimethoxysilyl)propyl-3-[N-3-triethoxysilyl)-propylamino] propionamide, 3-trimethoxysilylpropyl 3-[N-(3-trimethoxysilyl)-propylamino]-2-methyl propionate, 3-triethoxysilylpropyl 3-[N-(3-triethoxysilyl)-propylamino]-2-methyl propionate, 3-trimethoxysilylpropyl 3-[N-(3-triethoxysilyl)-propylamino]-2-methyl propionate, gamma-mercaptopropyl-trimethoxysilane and N,N'-bis((3-trimethoxysilyl)propyl)amine.

Useful commercially available aminosilanes include, e.g., aminosilanes available under the SILQUEST series of trade designations including, e.g., SILQUEST A-1170, SILQUEST A-1110, SILQUEST Y-9669 and SILQUEST A-15 from OSi Specialties-Crompton Corp. (Greenwich, Conn.), under the DYNASYLAN series of trade. designations including, e.g., DYNASYLAN 1189 N-(n-butyl) aminopropyltrimethoxysilane and DYNASYLAN MTMO 3-mercaptopropyl trimethoxy silane both of which are available from Degussa Corporation (Naperville, Ill.), and under the A-189 gamma-mercaptopropyltrimethoxysilane trade designation from OSi Specialties-Crompton Corp.

Useful methods of preparing silane functional polyurethane prepolymers are described, e.g., in U.S. Pat. Nos. 3,632,557, 4,345,053, 4,645,816 and 4,960,844, and incorporated herein.

One example of a useful method of preparing silane functional polyurethane prepolymers having pendant or terminal silane functional groups includes the reaction of a isocyanate organofunctional silane with polyhydroxy functional polyurethane prepolymer. Polyhydroxy functional polyurethane prepolymers can be prepared as described above with respect to the polyisocyanate functional polyurethane prepolymers with the exception that the reaction mixture has a stoichiometric excess of polyol relative to the diisocyanate component so as to form a hydroxy functional polyurethane prepolymer. Preferably the ratio of hydroxy groups to isocyanate groups in the reaction mixture is from about 1.1:1 to about 4:1, more preferably from about 1.2:1 to about 2.5:1.

The hydroxyfunctional polyurethane prepolymer is then reacted with one or more isocyanated silanes, e.g., isocyanated silanes having the formula OCN—R—Si(X)m(—OR$^1$)3-m wherein m is 0, 1 or 2, each R$^1$ is alkyl containing from 1 to 4 carbon atoms, preferably methyl or ethyl, each X is alkyl containing from 1 to 4 carbon atoms, preferably methyl or ethyl, and R is a difunctional organic group, preferably straight or branched difunctional alkyl containing from 2 to 6 carbon atoms such that the hydroxyl groups of the prepolymer are encapped with isocyanate silane. Silane endcappers suitable for the endcapping of the active hydrogen terminal atoms bearing urethane prepolymers are represented by the general formula OCN—R—Si(X)m(—OR$^1$)3-m wherein R, R', X and m are as defined above.

A number of useful structures for such isocyanate alkoxysilane compounds are disclosed in, e.g., U.S. Pat. No. 4,146,585 (columns 4 and 5), and incorporated herein. Preferred isocyanate alkoxysilanes include, e.g., garma-isocyanatepropyl-triethoxysilane and gamma-isocyanatepropyl-trimethoxysilane, commercially available examples of which are available under the trade designation SILQUEST A-35 and SILQUEST A-25 from OSi Specialties-Crompton Corp.

The polyurethane prepolymer preferably is present in the sealant composition in an amount of from 5% by weight to 50% by weight, more preferably from about 10% by weight to about 40% by weight, most preferably from about 15% by weight to about 35% by weight.

Other useful moisture curable polymers include silane functional polymers including silylated polyalphaolefins, silylated amorphous polyalphaolefins, silylated silane-functional polyisobutylene, si lane functional hydrogenated polybutadiene, si lane functional A-B-A block copolymers where the A blocks are polyvinyl aromatic blocks (e.g., styrene), and the B block is a rubbery midblock (e.g., isoprene, butadiene, ethylene-butylene, and ethylene-propylene) examples of which include styrene-butadiene-styrene block copolymers, styrene-isoprene-styrene block copolymers, styrene-ethylene-butylene-styrene block copolymers, styrene-ethylene-propylene-styrene block copolymers, and combinations thereof. Useful silane functional polymers are disclosed in, e.g., EP 906,378 and incorporated herein. Methods of making silane functional polyisobutylenes, polybutadienes and hydrogenated polybutadienes are described, e.g., in EP 287,025, EP 452,875, EP 434,840, EP 252,372, EP 79,456, EP 537,660, and EP 312,967 and incorporated herein.

The reactive plasticizer includes functional groups that are capable of reacting with a component of the moisture curable polymer (e.g., isocyanate, silane, or a combination thereof), a component of the reactive plasticizer, or a combination thereof. The term "reactive plasticizer" encompasses plasticizer that becomes reactive with the polyurethane prepolymer or with itself upon exposure to moisture. Such reactive plasticizers include plasticizers that bear an active hydrogen group upon exposure to moisture. The reactive plasticizer preferably is selected to have functional groups similar to the functional group(s) of the moisture curable polymer, functional groups that will become reactive with the moisture curable polymer or the plasticizer, itself, after the composition is applied to a substrate or during its intended use, (e.g., upon exposure to ambient atmosphere, e.g., air, moisture or a combination thereof), or a combination of such functional groups. The reactive plasticizer is preferably selected to polymerize or crosslink the moisture curable polymer upon exposure to ambient conditions, e.g., moisture, air or a combination thereof. The reactive plasticizer can include any suitable reactive group including, e.g., alkoxy, isocyanate, aldimine, ketomine, bisoxazolidones, and combinations thereof.

Examples of useful reactive plasticizers capable of reacting with silane functional moisture curable polymers include plasticizers having alkoxysilyl reactive groups including, e.g., methoxysilyl, ethoxysilyl, propoxysilyl, and butoxysilyl, and acyloxysilyl reactive groups including, e.g., silyl esters of various acids including, e.g., acetic acid, 2-ethylhexanoic acid, palmitic acid, stearic acid, and oleic acid, and combinations thereof. Suitable reactive plasticizers also include polymers endcapped with the above-described alkoxysilyl groups. Such polymers include, e.g., polyalkylene oxides (e.g., polypropylene oxides), polyether-sulfide-urethanes (e.g., low molecular weight PERMAPOL urethanes from PRC and as disclosed, e.g., in U.S. Pat. No. 4,960,844), polyisoalkylene oxides (e.g., polyisobutylene oxide), polyglycols, polyisobutylene, and combinations thereof.

Useful reactive plasticizers capable of reacting with isocyanate functional polyurethane prepolymers include, e.g., aldimines, ketimines, oxazolidines (e.g., bisoxazolidines, 1-(hydroxyethyl)-2-isopropyl-1,3-oxazolidine and 2-isopropyl-1,3-oxazolidine), dioxolanes (e.g., 2,2-dimethyl-1,3-dioxolane, 2,2-dimethyl-4-hydroxymethyle-1,3-dioxolane), and combinations thereof.

The reactive plasticizer preferably has a molecular weight of from about 300 g/mol to about 10,000 g/mol, more preferably from about 500 g/mol to about 6000 g/mol.

The reactive plasticizer is preferably present in the composition in an amount of no greater than 20% by weight, preferably from about 2% by weight to about 15% by weight, more preferably from about 3% by weight to about 10% by weight.

Useful thermoplastic polymers are compatible with the sealant composition and include thermoplastic elastomers. Examples of useful thermoplastic polymers include polyalkylenes (e.g., polyethylene, polypropylene and polybutylene), poly(alpha)olefins including, e.g., homo-, co- and terpolymers of aliphatic mono-1-oleins (alpha olefins) (e.g., poly(alpha)olefins containing from 2 to 10 carbon atoms), homogeneous linear or substantially linear interpolymers of ethylene having at least one $C_3$ to $C_{20}$ alphaolefin, polyisobutylenes, poly(alkylene oxides), poly(phenylenediamine terephthalamide), polyesters (e.g., polyethylene terephthalate), polyacrylates, polymethacrylates, polyacrylamides, polyacrylonitriles, copolymers of acrylonitrile and monomers including, e.g., butadiene, styrene, polymethyl pentene, and polyphenylene sulfide (e.g., styrene-acrylonitrile, acrylonitrile-butadiene-styrene, acrylonitrile-styrene-butadiene rubbers), polyimides, polyamides, copolymers of vinyl alcohol and ethylenically unsaturated monomers, polyvinyl acetate (e.g., ethylene vinyl acetate), polyvinyl alcohol, vinyl chloride homopolymers and copolymers (e.g., polyvinyl chloride), terpolymers of ethylene, carbon monoxide and acrylic acid ester or vinyl monomer, polysiloxanes, polyurethanes, polystyrene, and combinations thereof, and homopolymers, copolymers and terpolymers thereof, and mixtures thereof. Other useful classes of thermoplastic polymers include asphalts, bitumens, crude rubbers, fluorinated rubbers, and cellulosic resins.

Preferred thermoplastic polymers include ethylene vinyl acetate having a vinyl acetate content of from about 10% by weight to about 60% by weight and a melt index of from about 0.2 to 1000, more preferably a vinyl acetate content of from about 18% by weight to about 50% by weight and a melt index of from about 0.2 to 500.

Useful commercially available thermoplastic polymers include, e.g., atactic polypropylene copolymers available under the REXTAC series of trade designations including, e.g., REXTAC RT 2535 and RT 2585, from Rexene Products Co. (Dallas, Tex.) and the EASTOFLEX series of trade designations including, e.g., EASTOFLEX E1060, from Eastman Chemical Co. (Kingsport, Tenn.); ethylene vinyl acetate copolymers available under the ELVAX series of trade designations from DuPont de Nemours (Wilmington, Del.) and the ULTRATHENE series of trade designations from Millennium Petrochemicals (Rolling Meadows, Ill.); ethylene methyl acrylate copolymers available under the OPTEMA series of trade designations from Exxon Chemical Co. (Houston, Tex.); ethylene n-butyl acrylate copolymers available under the LOTRYL series of trade designations from Elf Atochem North America (Philadelphia, Pa.), the ESCORENE series of trade designations from Exxon Chemical Co. and the ENATHENE series of trade designations from Millennium Petrochemicals; ethylene n-butyl acrylate carbon monoxide terpolymers available under the ELVALOY series of trade designations from DuPont; thermoplastic polyurethane polymers available under the PEARLSTICK series of trade designations from Aries Technologies (Derry, N.H. a distributor for Merquinsa, Barcelona, Spain); butylene/poly(alkylene ether) phthalate polymers available under the HYTREL series of trade designations from DuPont; ethylene acrylate copolymers also available under the ELVALOY series of trade designations from DuPont; and acrylic polymers available under the ELVACITE series of trade designations from ICI Acrylics (St. Louis, Mo.).

Useful commercially available homogeneous linear or substantially linear interpolymers of ethylene having at least one $C_3$ to $C_{20}$ alphaolefin and a polydispersity less than about 2.5 include, e.g., EXACT 5008 ethylene-butene copolymer, EXXPOL SLP-0394 ethylene-propylene copolymer, EXACT 3031 an ethylene-hexene copolymer from Exxon Chemical Co. (Houston, Tex.), and ethylene/l-octene polymers available under the trade designations AFFINITY, INSIGHT and ENGAGE from Dow Chemical Co. (Midland, Mich.).

Useful thermoplastic elastomers include, e.g., polyetheramide block copolymers, polyesters, butadiene-styrene elastomers including, e.g., A-B, A-B-A, A-(B-A)n-B, (A-B)n-Y, and radial block copolymers and grafted versions thereof where the A block(s) is a polyvinyl aromatic block (e.g., styrene), and the B block is a rubbery midblock (e.g., isoprene, butadienc, ethylene-butylene, and ethylene-propylene) (e.g., styrene-butadiene-styrene block copolymers, styrene-isoprene-styrene block copolymers, styrene-ethylene-butylene-styrene block copolymers, styrene-ethylene-propylene-styrene block copolymers), polyurethane elastomers, polyolefin elastomers, and mixtures thereof.

Useful commercially available thermoplastic elastomers include, e.g., isobutylene-isoprene copolymers available the BUTYL Rubber series of trade designations including BUTYL 268 and BUTYL 065 from Exxon Chemical Co. (Houston, Tex.); ethylene-propylene copolymers available under the VISTALON series of trade designations including, e.g., VISTALON 404, from Exxon Chemical Co.; styrene-ethylene/butylene-styrene block copolymers available under the KRATON G series of trade designations including, e.g., KRATON G-1652 and G-1657, from Shell Chemical Co. (Houston, Tex.); styrene-butadiene-styrene and styrene-isoprene-styrene block copolymers available under the KRATON D series of trade designations including, e.g., KRATON D-1111 and D-1112 from Shell Chemical Co.; silane terminated block copolymers available under the KRATON SKFG101 trade designation from Shell Chemical Co.; and styrene-butadiene-styrene and styrene-isoprene-styrene block copolymers available under the VECTOR series of trade designations including, e.g., VECTOR 4112, 4114 and 4411 from Dexco Polymers (Houston, Tex.).

The thermoplastic polymer is present in the composition in an amount of from about 5% by weight to about 80% by weight, preferably from about 10% by weight to about 70% by weight, more preferably from about 15% by weight to about 60% by weight.

The composition can optionally include tackifying agent. Preferred tackifying agents have a ring and ball softening point of from about 70° C. to about 150° C., more preferably from about 80° C. to about 120° C. Examples of suitable tackifying agents include aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g., phenolic modified terpene resins), hydrogenated derivatives thereof and mixtures thereof; natural and modified rosins such as gum rosin, wood rosin, tall oil rosin, distilled rosin, hydrogenated rosin, dimerized rosin and polymerized rosin; rosin esters including, e.g., glycerol and pentaerythritol esters of natural and modified rosins (e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin); alpha methyl styrene resins and hydrogenated derivatives thereof; low molecular weight polylactic acid; and combinations thereof. Other useful tackifying agents are disclosed in, e.g., U.S. Pat. No. 6,355,317, and incorporated herein.

Suitable commercially available tackifying agents include, e.g., partially hydrogenated cycloaliphatic petroleum hydrocarbon resins available under the EASTOTAC series of trade designations including, e.g., EASTOTAC H-100, H-115, H-130 and H-142 from Eastman Chemical Co. (Kingsport, Tenn.) available in grades E, R, L and W, which have differing levels of hydrogenation from least hydrogenated (E) to most hydrogenated (W), the ESCOREZ series of trade designations including, e.g., ESCOREZ 5300 and ESCOREZ 5400 from Exxon Chemical Co. (Houston, Tex.), and the HERCOLITE 2100 trade designation from Hercules (Wilmington, Del.); partially hydrogenated aromatic modified petroleum hydrocarbon resins available under the ESCOREZ 5600 trade designation from Exxon Chemical Co.; aliphatic-aromatic petroleum hydrocarbon resins available under the WINGTACK EXTRA trade designation from Goodyear Chemical Co. (Akron, Ohio); styrenated terpene resins made from d-limonene available under the ZONATAC 105 LITE trade designation from Arizona Chemical Co. (Panama City, Fla.); aromatic hydrogenated hydrocarbon resins available under the REGAL-REZ 1094 trade designation from Hercules; and alphamethyl styrene resins available under the trade designations KRISTALEX 3070, 3085 and 3100, which have softening points of 70° C., 85° C. and 100° C., respectively, from Hercules.

For those sealant compositions that include ethylene vinyl acetate, the tackifying agent is preferably selected based upon the vinyl acetate content of the ethylene vinyl acetate copolymer. For ethylene vinyl acetate copolymers having a vinyl acetate content of at least 28% by weight, the tackifying agent is preferably an aromatic or aliphatic-aromatic resin having a ring and ball softening point of from 70° C. to about 120° C. For vinyl acetate copolymers having a vinyl acetate content less than 28% by weight, the tackifying agent is preferably aliphatic or aliphatic-aromatic resin having a ring and ball softening point of from 70° C. to about 120° C.

The tackifying agent is preferably present in the composition in an amount of from about 5% by weight to about 45% by weight, preferably from about 10% by weight to about 40% by weight, more preferably from about 10% by weight to about 30% by weight.

The composition can also optionally include organofunctional silane adhesion promoters. Preferred organofunctional silane adhesion promoters include silyl groups such as alkoxysilyls, aryloxysilyls, alkyloxyiminosilyls, oxime silyls, amino silyls, and combinations thereof. Examples of useful alkoxysilyl groups include methoxysilyl, ethoxysilyl, propoxysilyl, butoxysilyl, and acyloxysilyl reactive groups including, e.g., silyl ester of various acids including, e.g., acetic acid, 2-ethylhexanoic acid, palmitic acid, stearic acid, and oleic acid.

Suitable organofunctional silane adhesion promoters include, e.g., glycidoxy propyl trimethoxy silane, amino propyl trimethoxy silane, amino propyl triethoxy silane, N-phenyl amino propyl trimethoxy silane, bis-(trimethoxy silyl propyl)amine, N-beta-(aminoethyl)-amino propyl trimethoxy silane, N-beta-(aminoethyl)-amino propyl trimethoxy silane, N-beta-(aminoethyl)-amino propyl methyl dimethoxy silane, ureido propyl trimethoxy silane, tris[3-(trimethoxysilyl)propyl]isocyanurate, 4-amino-3,3-dimethylbutyltrimethoxysilane, and 4-amino-3,3-dimethylbutyldimethoxymethylsilane, and ethoxy and methoxy/ethoxy versions thereof, and mixtures thereof.

Suitable commercially available adhesion promoters include, e.g. silane adhesion promoters available under the trade designations SILQUEST A-1110 SILQUEST A-1120, SILQUEST Y-11012, SILQUEST Y-11639, SILQUEST Y-11597, SILQUEST A-2120, SILQUEST A-1170 and SILQUEST A-187, all of which are available from Witco Corporation, OSi Specialties-Crompton Corp. and UPS 1146 and DAMO 1411 both of which are available from Degussa Corporation (Naperville, Ill.).

The adhesion promoter, when present in the composition, is preferably present in an amount of from about 0.1% by weight to about 5% by weight, preferably from about 0.1% by weight to about 3% by weight, more preferably from about 0.1% by weight to about 2% by weight.

The composition can also include a catalyst to facilitate the reaction between the polyol and polyisocyanate, hydrolysis, and/or the subsequent crosslinking reaction of the silane groups and/or isocyanate groups. Useful catalysts include, e.g., tertiary amines including, e.g., N,N-dimethylaminoethanol, N,N-dimethyl-cyclohexamine-bis (2-dimethyl aminoethyl)ether, N-ethylmorpholine, N,N,N', N',N"-pentamethyl-diethylene-triamine, and 1-2 (hydroxypropyl) imidazole, and metal catalysts including, e.g., tin (e.g., dialkyl tin dicarboxylates, e.g., dibutyl tin dilaurate and dibutyl tin diacctate, tertiary amines, stannous salts of carboxylic acids, e.g., stannous octoate and stannous acetate, tetrabutyl dioleatodistannoxane), titanium compounds, tin carboxylates, organosilicon titantates, alkyltitantates, and combinations thereof.

The composition can also include other additives including, e.g., fillers, ultraviolet light stabilizers, antioxidants, catalysts, rheology modifiers, biocides, corrosion inhibitors, dehydrators, organic solvents, colorants (e.g., pigments and dyes), surfactants, flame retardants, waxes, and mixtures thereof. Suitable fillers include, e.g., fumed silica, precipitated silica, talc, calcium carbonates, carbon black, aluminasilicates, clay, zeolites, ceramics, mica, titanium dioxide, and combinations thereof.

The sealant composition is particularly useful for bonding glass to various substrates including other glass substrates, polymer substrates (e.g., integral spacers of insulating sash assemblies), metallic substrates (e.g., spacers for insulating glass units), and combinations thereof, and providing a moisture barrier function in a variety of applications and constructions. The sealant composition is particularly useful in constructions including, e.g., insulating glass units, sash frame assemblies, back bedding, automotive and moulding applications, windows, doors, walls, and constructions that require good adhesion to glass, metal, plastic and combinations thereof.

In soine embodiments, the sealant composition is used to bond at least one pane of glass to a structural support, e.g., a spacer in an insulating glass unit, one or more legs or surfaces of a spacer in an insulating sash assembly, the frame to which an insulating glass unit is bonded during a back bedding operation, and combinations thereof. The spacer can be of a variety of compositions including, e.g., wood, metal, plastic (e.g., polyvinyl chloride), composites (e.g., polymer and wood fiber composites) and combinations thereof.

Insulating glass assemblies are available in a variety of configurations. Examples of integrated multipane window units, insulating glass units, and sash assemblies and methods of making them are described in U.S. Pat. Nos. 6,463,706, 6,401,428, 6,286,288, 6,055,783, 5,873,203, 5,653,073 and PCT Publication No. WO 99/14169 (Guhl et al.) and WO 98/25001 (France), and incorporated herein.

An example of a useful method of making an insulating glass assembly is described in copending U.S. Provisional Patent Application Seral No. 60/453872, filed Mar. 11, 2003 and entitled, "Sealant Compositions For Forming Adhesive Bonds To Glass At Low Temperature," Attorney Docket No. DU-036-US01, and incorporated herein. A useful process includes applying a sealant composition to a surface of a spacer, the spacer extending from a frame and being integral with the frame, contacting the sealant with a glass pane, and applying pressure on the glass pane to bond the glass pane to the spacer through the sealant composition, the applied pressure being from about 5 psi to about 100 psi at a temperature of from about 15° C. to about 60° C.

The invention will now be described by way of the following examples.

EXAMPLES

Test Procedures

Test procedures used in the examples include the following.

Tensile Strength, Modulus at 100% Elongation and Elongation Test Method

The tensile strength at break, modulus at 100% elongation and % elongation of a sealant composition is determined according to ASTM-D638-00 entitled, "Standard Test Method for Tensile Properties of Plastics."

A homogeneous film of the sealant composition is pressed at 100° C. to a thickness of from 40 mil to 60 mil. The film is conditioned at 23° C. and 50% relative humidity for two weeks to cure. Specimens are cut from the film and tested for tensile strength at 25%, 50% and 100% elongation, modulus at 100% elongation and elongation according to ASTM D638-00.

Lap Shear Strength

The lap shear strength is determined according to ASTM C-961-01 entitled, "Standard Test Method for Lap Shear Strength of Hot Applied Sealants," using polyvinyl chloride (PVC) and glass substrates. The test method is modified to a sealant thickness of approximately 40 mils. The bond samples are conditioned at 23° C. and 50% relative humidity for the periods indicated in the tables.

Initial Lap Shear (i.e., green strength) is determined within about one to two hours after preparing the bond sample.

Viscosity

Viscosity is measured using a Brookfield Thermosel Viscometer optionally attached to a chart recorder. The spindle and rotations per minute are set in accordance with the manufacturer's operating instructions to obtain accurate results.

Molecular Weight by Gel Permeation Chromatography

The molecular weight of the prepolymer is determined by gel permeation chromatography (GPC) by dissolving the prepolymer in tetrahydrofuran and injecting the solution into a GPC and calculating the molecular weight relative to a polystyrene standard.

Permeability Coefficient (MVTR)

The permeability coefficient (MVTR) is determined according to ASTM F1249-90 entitled, "Standard Test Method for Water Vapor Transmission Rate Though Plastic Film and Sheeting using a Modulated Infrared Sensor." The test is conducted at approximately 37° C. (100° F.) and 90% relative humidity on a sample in the form of a film having a specified thickness.

Dead Load at 140° F.

Samples prepared according to the lap shear method are conditioned for at least two weeks at 23° C. and 50% relative humidity. A one pound weight is suspended from the lap shear bond of the sample while the sample is exposed to 140° F. for one week. The static load resistance (i.e., dead load) of lap-shear bonds to polyvinyl chloride and glass is measured. If the one pound weight remains suspended, a sample is recorded as a "pass." If the one pound weight falls from the sample prior to the end of the one week period, the time at failure is recorded and the sample is recorded as a "fail."

Glass Transition Temperature (Tg)

The glass transition temperature (Tg) of a sealant composition is determined according to ASTM D-3418-83 entitled, "Standard Test Method for Transition Temperatures of Polymers by Differential Scanning Calorimetry (DSC)" by conditioning a sample at 130° C. for two minutes, quench cooling the sample to −60° C., and then heating the sample to 130° C. at a rate of 20° C. per minute. The reported Tg is the temperature at which onset of the phase change occurs.

Hardness

The hardness of the sealant composition is measured using a Shore A durometer according to ASTM D-2240.

Open Time

The open time is determined using a Rheometrics Dynamic Spectrometer (RDS) 7700 (Rheometric Scientific, Piscataway, N.J.) equipped with a nitrogen controller and a mid range transducer. The sample container is purged with nitrogen and placed in an oven. The oven is equilibrated at a set temperature (i.e., the temperature of interest) for about 45 minutes to one hour. A sufficient volume of sample (e.g., from 10 to 20 grams) is preheated to a temperature sufficient to soften the sample. The top skin, if present, is removed from the sample and then the sample is mixed to provide a uniform composition. The sample is placed between two parallel plates arranged as a lower plate at 50 mm and an upper plate at 25 mm such that there is a gap between the plates of from 1 mm to 2.5 mm. The frequency is set to 1.0 radian/second and the strain to 1.26%. The tan delta (G"/G') as a function of time is measured and recorded for from 10 to 30 minutes. The time at which tan delta is 1.0 is recorded as the open time.

Softening Temperature

The softening temperature is determined using a RDS 7700 spectrometer equipped with a nitrogen controller and a mid range transducer. A sufficient volume of sample is preheated to soften the sample. The top skin, if present, is removed from the sample and then the sample is mixed to provide a uniform composition. The sample is placed between two parallel plates arranged as a lower plate at 50 mm and an upper plate at 25 mm such that there is a gap between the plates of from 1 mm to 2.5 mm. The plates are heated to a temperature such that the material flows under compression (about 120° C.). The gap is adjusted to a distance of from 1 mm to 2.5 mm. The frequency is set to 10.0 radians/second and the strain to 1.26%. A temperature sweep is conducted from a high temperature to a low temperature at a rate of 3° C./min, where the high temperature and the low temperature are selected to encompass the softening temperature. The tan delta (G"/G'), G' and G" are recorded as a function of temperature. The softening temperature is recorded as the temperature at which G' and G" crossover each other (i.e., where tan delta equals 1.0).

Conditioning

Wet UV Conditioning

A sample, e.g., the lap shear bond construction in the case of lap shear testing, is placed in a chamber and continuously exposed to ultraviolet light (UV-A) and 100% humidity at 95° F. for a specified period.

−40° F./160° F. Temperature Cycling

A sample, e.g., the lap shear bond construction in the case of lap shear testing, is placed in a Cincinnati Sub Zero Chamber Model No. U-15-X-X25. The temperature in the chamber is cycled from −40° F. to 160° F. four times every 24 hours.

100% Relative Humidity/140° F. Conditioning

A sample, e.g., the lap shear bond construction in the case of lap shear testing, is placed in a chamber in which the relative humidity is 100% and the temperature is 140° F. for a specified period.

Polyurethane Prepolymer Preparation

Prepolymer 1 (PP 1)

A silane-terminated polyurethane prepolymer was prepared as follows. A reaction vessel equipped with a mechanical stirrer, a thermometer, a condenser and a dry nitrogen inlet was heated to from 60° C. to 70° C. and placed under vacuum. Into the reaction vessel was placed, with agitation, a blend of 35.06 g PRIPLAST 3187 polyester diol (Uniqema, (New Castle, Del.) 35.06 g. PRIPLAST 3190 dimer acid-based polyester diol (Uniqema), and 4.67 g ALFOL C14 1-tetradecanol (Condea Vista Company, Houston, Tex.), which had previously been heated to from about 50° C. to about 60° C. The reactor contents were then placed under nitrogen and 0.58 g IRGANOX 1010 antioxidant was added. The mixture was mixed under vacuum for one hour while maintaining the contents at about 70° C. to 75° C.

To the mixture in the reaction vessel was then added 15.78 g MONDUR ML a blend of 2,4'-diphenylmethane diisocyanate (MDI) and 4,4'-diphenylmethane diisocyanate (50/50) (Bayer, Germany). The reaction vessel was maintained at 75° C. for three hours or until the percent isocyanate content was 1.8% +/−0.3 as measured according to ASTM D-2572-80. The temperature of the reaction vessel was then lowered to from 50° C. to 55° C. and 8.85 g SILQUEST ALINK 15 N-ethyl-3-trimethoxysilyl-2-methyl propanamine (OSi Specialties-Crompton Corp.) was added to the mixture, which was then maintained at from 50° C. to 60° C. for 45 minutes or so to a final isocyanate concentration of less than 0.1% as measured according to ASTM D-2572-80.

Prepolymer 2 (PP 2)

A silane-terminated polyurethane prepolymer was prepared as follows. A reaction vessel equipped with a mechanical stirrer, a thermometer, a condenser and a dry nitrogen inlet was heated to from 60° C. to 70° C. and placed under vacuum. Into the reaction vessel was placed, with agitation, a blend of 67.43 g PRIPLAST 3187 polyester diol (Uniqema, (New Castle, Del.) and 4.25 g ALFOL C14 1-tetradecanol (Condea Vista Company, Houston, Tex.), which had previously been heated to from about 50° C. to about 60° C. The reactor contents were then placed under nitrogen and 0.56 g IRGANOX 1010 antioxidant was added. The mixture was mixed under vacuum for one hour while maintaining the contents at about 70° C. to 75° C.

To the mixture in the reaction vessel was then added 14.41 g MONDUR ML blend of 2,4'-diphenylmethane diisocyanate (MDI) and 4,4'-diphenylmethane diisocyanate (50/50) (Bayer Ag, Germany). The reaction vessel was maintained at 75° C. for three hours or until the percent isocyanate content was 1.4% +/−0.3 as measured according to ASTM D-2572-80. The temperature of the reaction vessel was then lowered to from 50° C. to 55° C. and 6.32 g SILQUEST ALINK 15

N-ethyl-3-trimethoxysilyl-2-methyl propanamine (OSi Specialties-Crompton Corp.) was added to the mixture, which was then maintained at from 50° C. to 60° C. for 45 minutes as measured according to ASTM D-2572-80 to a final isocyanate concentration of less than 0.1%. Then 6.32 g SILQUEST Y11639 1-butanamine-2,2-dimethyl-4-(dimethoxy methylsilyl) amino dimethoxysilane (OSi Specialties-Crompton Corp.) and 0.71 DYNASYLAN 6490 vinyl trimethoxysilane (Degussa Corporation, Naperville, Ill.), were added with mixing under nitrogen and maintained at 50° C. to 60° C. for 30 minutes.

Prepolymers (PP) 3–5

Prepolymers 3–5 were prepared according to the method used to prepare prepolymer 1, with the exception that the components and the amounts thereof were as specified in Table 1.

Prepolymer 6 (PP 6)

An isocyanate-terminated polyurethane prepolymer was prepared as follows. A reaction vessel equipped with a mechanical stirrer, a thermometer, a condenser and a dry nitrogen inlet was heated to from 60° C. to 70° C. and placed under vacuum. Into the reaction vessel was placed, with agitation, 73.16 g RUCOFLEX XS-5704-55M dimer acid-based polyester polyol (Ruco Polymer Corp., Hicksville, N.Y.). The reactor contents were then placed under nitrogen and mixed under vacuum for one hour while maintaining the contents at about 70° C. to 75° C. To the mixture in the reaction vessel was then added 22.84 g ISONATE 125M 2,4'-methylene diphenyl diisocyanate and 4,4-methylene diphenyl diisocyanate (Dow Chemical Co., Midland, Mich.) The reaction vessel was maintained at 75° C. for three hours or until the percent isocyanate content was 4.8% +/−0.3 as measured according to ASTM D-2572-80.

TABLE 1

|  | PP 1 | PP 2 | PP 3 | PP 4 | PP 5 | PP 6 |
| --- | --- | --- | --- | --- | --- | --- |
| Priplast 3190 | 35.06 | 0 | 34.63 | 35.12 | 0 | 0 |
| Priplast 3187 | 35.06 | 67.43 | 34.63 | 35.12 | 0 | 0 |
| Poly bd R45 HT LF3[1] | 0 | 0 | 0 | 0 | 77.9 | 0 |
| Rucoflex XS-5704-55M | 0 | 0 | 0 | 0 | 0 | 73.16 |
| Alfol 14 | 4.67 | 4.25 | 0 | 6.56 | 3.46 | 0 |
| Alfol 18[2] | 0 | 0 | 5.84 | 0 | 0 | 0 |
| Irganox 1010 | 0.58 | 0.56 | 0.58 | 0.59 | 0.43 | 0 |
| Mondur ML | 15.78 | 14.41 | 15.58 | 15.8 | 11.68 | 0 |
| Isonate 125M | 0 | 0 | 0 | 0 | 0 | 22.84 |
| Silquest Alink 15 | 8.85 | 6.32 | 8.74 | 6.82 | 6.52 | 0 |
| Silquest Y-11639 | 0 | 6.32 | 0 | 0 | 0 | 0 |
| Silquest Y11597[3] | 0 | 0 | 0 | 0 | 0 | 4 |
| Dynasylan 6490 | 0 | 0.71 | 0 | 0 | 0 | 0 |
| Total Prepolymer % | 100 | 100 | 100 | 100.01 | 99.99 | 100 |
| NCO/OH | 1.43 | 1.32 | 1.43 | 1.3 | 1.43 | 2.7 |
| NCO/OH-excluding Alfol | 1.91 | 1.72 | 1.91 | 1.91 | NT | NA |
| % Molar Equivalents NCO endcapped with Alfol | 35 | 41 | 35 | 50 | 36 | 0 |
| % Molar Equivalents NCO endcapped with A15 | 65 | 59 | 65 | 50 | 64 | 0 |
| Number Average Molecular Weight (Mn) | 3780 | 4360 | 4110 | 4110 | 6930 | 4170 |
| Polydispersity Index | 3.7 | 3.8 | 3.4 | 3.6 | 5 | 2.6 |

[1]POLY BD 45 HT LF3 hydroxyl terminated polybutadiene (Atofina Chemicals, Inc., Exton, Pennsylvania)
[2]Alfol 18 1-octadecanol (Condea Vista Company, Houston, Texas)
[3]Silquest Y11597 tris-[-3-(trimethyoxysilyl)propyl]isocyanurate (OSi Specialties-Crompton Corp.)
ND = not determined Sealant Preparation Example 1

The sealant composition of Example 1 was prepared as follows. The above-described prepolymer (PPl) was preheated to from 50° C. to 60° C. for from 1 to 2 hours. Into a reaction vessel, which was heated to 100° C. and equipped with a mechanical stirrer, a thermometer, a condenser and a dry nitrogen inlet, was added 10.6 g ESCOREZ 5690 hydrogenated, aromatic modified, cyclo-aliphatic hydrocarbon resin (ExxonMobil Chemical, Houston, Tex.). After the ESCOREZ 5690 resin was partially melted, incremental amounts of ATEVA 2850 ethylene vinyl acetate (AT Plastics, Brampton, Ontario, Canada) and ATEVA 4030AC ethylene vinyl acetate (AT Plastics) were added to the reaction vessel such that a total amount of 10.6 g ATEVA 2850 ethylene vinyl acetate and 10.6 g ATEVA 4030AC ethylene vinyl acetate was added and mixed under vacuum for 15 to 30 minutes to obtain a uniform mixture. The mixture was maintained at approximately 100° C. and 30.5 g MISTRON VAPOR anhydrous fine grade talc was added with mixing. The mixture was mixed under vacuum for one hour. The temperature was then adjusted to from 85° C. to 95° C. and purged with nitrogen during the addition of 30 g prepolymer 1 and 5.1 g SILYL SAT 010 silyl-terminated polyether (Kaneka Corporation, Tokyo, Japan). The mixture was then mixed under vacuum for one hour.

Then 2 g SILQUEST Y11639 1-butanamine-2,2-dimethyl-4-(dimethoxy methylsilyl) amino dimethoxysilane (OSi Specialties-Crompton Corp.) and 0.5 g DYNASYLAN 6490 vinyl trimethoxysilane (Degussa Corporation, Naperville, Ill.), were added with mixing under nitrogen and maintained at 70° C. to 80° C. for 15 to 30 minutes.

A vacuum was applied for from 30 minutes to one hour. The vessel was then placed under nitrogen and 0.1 g METATIN 740 catalyst (Acima Chemical Industries Limited, Inc., Switzerland) was added and again a vacuum was applied for 15 minutes while mixing.

The sealant composition of Example 1 was cured by exposing the composition to 23° C. and 50% relative humidity for five weeks. The cured and uncured sealant of Example 1 was tested according to the above test methods as indicated in Table 1. To determine softening temperature, the temperature sweep was conducted from 120° C. to −30° C. The results are reported in Table 2.

Examples 2–15

The sealant compositions of Examples 2–15 were prepared according to the above-described sealant preparation method of Example 1 with the exception that the components and amounts thereof were as specified in Tables 2 and 4.

The sealants of Examples 1–15 were tested according to the test methods set forth herein. To the extent that variations were made to the test conditions or test method, the variations are indicated. The viscosity of the sealant compositions was determined by placing a sample weighing from 15 g to 16 g in a Brookfield thermosel viscometer using a number 29 spindle at 230° F.

The results are reported in Tables 3 and 5.

TABLE 2

|  | 1 | 2 | 3 | 4 | 5 | 6 |
|---|---|---|---|---|---|---|
| Ateva 4030 | 10.6 | 10.1 | 11.99 | 9.6 | 9.6 | 9.6 |
| Ateva 2850 | 10.6 | 10.1 | 11.99 | 9.6 | 9.6 | 9.6 |
| Escorez 5690 | 10.6 | 15 | 17.99 | 19.3 | 19.3 | 19.3 |
| Prepolymer 1 | 30 | 28.4 | 0 | 27 | 0 | 0 |
| Prepolymer 2 | 0 | 0 | 26.48 | 0 | 0 | 0 |
| Prepolymer 3 | 0 | 0 | 0 | 0 | 0 | 27 |
| Prepolymer 4 | 0 | 0 | 0 | 0 | 27 | 0 |
| Mistron Vapor talc | 30.5 | 29 | 27.48 | 27.5 | 27.5 | 27.5 |
| Irganox 1010 | 0 | 0 | 0.22 | 0 | 0 | 0 |
| Paroil 1650[4] | 0 | 0 | 0 | 0 | 0 | 0 |
| Silyl SAT 010 | 5.1 | 4.85 | 3.83 | 4.6 | 4.6 | 4.6 |
| Silquest Y11639 | 2 | 2 | 0 | 1.9 | 1.9 | 1.9 |
| Dynasylan 6490 | 0.5 | 0.5 | 0 | 0.45 | 0.45 | 0.45 |
| Metatin 740 | 0.1 | 0.05 | 0.02 | 0.05 | 0.05 | 0.05 |
| Total | 100 | 100 | 100 | 100 | 100 | 100 |

[4]Paroil 1650 liquid chlorinated paraffin (Dover Chemical Corp., Dover, Ohio)

TABLE 3

|  | 1 | 2 | 3 | 4 | 5 | 6 |
|---|---|---|---|---|---|---|
| Initial Lap Shear (i.e., green strength) (psi) | 28 | 26 | 13 | 30 | 19 | 20 |
| Lap shear strength after 1 week at 23° C. and 50% Relative Humidity (psi) | 93 | 77 | NT | 79 | 76 | 51 |
| Lap shear strength after 3–4 weeks at 23° C. and 50% Relative Humidity (psi) | 142 | 153* | 134 | 155* | NT | 91 |
| Lap shear strength after 1 week at 140° F. and 100% Relative Humidity* (psi) | >200 glass broke | 203 | 220 | 187 glass broke | 186 | 128 |
| Lap shear after 1 week of temperature cycling from −40° F. to 160° F.* | 0 | NT | 175 | NT | NT | NT |
| Lap shear after 1 week in wet UV chamber* | NT | NT | 180 | NT | NT | NT |
| Dead load after 3–4 weeks at 23° C. and 50% Relative Humidity | P | P | P | P | F within 2 hrs | F within 2 hrs |
| Viscosity at 230° F. (cps) | NT | NT | 232,000 | NT | NT | NT |
| Softening T (° C.) | 48 | 34 | 37 | 26 | 40 | 20 |
| Open time (sec) | NT | 20 | 150 | 175 | 60 | 175 |
| Tg (° C.) | NT | NT | NT | −15 | −10 | −18 |
| Initial Shore A | NT | NT | 22 | NT | NT | NT |
| Modulus at 100% Elongation | 339 | 293 | 170 | 186 | 239 | 136 |
| Tensile strength (psi) | 515 | 195 | 297 | 365 | 542 | 286 |
| Elongation (%) | 292 | 346 | 365 | 319 | 398 | 475 |
| MVTR at 100° F. and 90% Relative Humidity (g/m²/day) 40 mil film | NT | NT | 4.6 | NT | NT | NT |
| Final Shore A | NT | NT | 48 | NT | NT | NT |
| % recovery after 24 hrs @ 200% elongation | NT | NT | 93 | NT | NT | NT |

*Lap shear bonds were pre-conditioned for 2 weeks at 23° C. and 50% relative humidity prior to the specified conditioning
NT = Not Tested

TABLE 4

|  | 7 | 8 | 9 | 10 | 11 | 12 | 13 | 14 | 15 |
|---|---|---|---|---|---|---|---|---|---|
| Ateva 4030 | 19.7 | 17 | 0 | 17 | 0 | 12.51 | 11.86 | 11.24 | 9.8 |
| Ateva 2850 | 19.1 | 17 | 22 | 17 | 15.5 | 12.51 | 11.86 | 11.24 | 0 |
| Ateva 2830[5] | 0 | 0 | 0 | 0 | 0 | 0 | 0 | 0 | 9.6 |
| Escorez 5615[6] | 15.3 | 0 | 0 | 0 | 7.6 | 0 | 0 | 0 | 0 |
| Escorez 5690 | 0 | 0 | 0 | 0 | 0 | 18.77 | 17.80 | 16.86 | 20 |
| Sylvarez ZT 105LT[7] | 0 | 15 | 0 | 11 | 0 | 0 | 0 | 58 | 0 |
| RT-2730[8] | 0 | 0 | 0 | 0 | 14 | 0 | 0 | 0 | 0 |
| Butyl 065[9] | 0 | 0 | 0 | 0 | 8.2 | 0 | 0 | 0 | 0 |
| Prepolymer 2 | 0 | 0 | 0 | 0 | 0 | 27.60 | 26.22 | 24.85 | 0 |
| Prepolymer 5 | 0 | 0 | 0 | 0 | 0 | 0 | 0 | 0 | 26 |
| Prepolymer 6 | 20.4 | 20 | 21.9 | 20 | 16.7 | 0 | 0 | 0 | 0 |
| Mistron Vapor talc | 25.5 | 25 | 19.4 | 25 | 30.4 | 28.57 | 27.21 | 25.76 | 28.5 |
| Silyl SAT 010 | 0 | 6 | 0 | 0 | 0 | 0 | 5.00 | 10 | 4.6 |

TABLE 4-continued

|  | 7 | 8 | 9 | 10 | 11 | 12 | 13 | 14 | 15 |
|---|---|---|---|---|---|---|---|---|---|
| Kaneka Epion 800S[10] | 0 | 0 | 0 | 10 | 0 | 0 | 0 | 0 | 0 |
| Silquest 11639 | 0 | 0 | 0 | 0 | 0 | 0 | 0 | 0 | 1.5 |
| Indopol H-1900[11] | 0 | 0 | 15.8 | 0 | 7.6 | 0 | 0 | 0 | 0 |
| Metatin 740 | 0 | 0 | 0 | 0 | 0 | 0.03 | 0.05 | 0.05 | 0.01 |
| Total | 100 | 100 | 100 | 100 | 100 | 100 | 100 | 100 | 100 |

[5]Ateva 2830 ethylene vinyl acetate copolymer (AT Plastics, Ontario, Canada)
[6]Escorez 5615 aromatic modified, cycloaliphatic hydrocarbon resins (ExxonMobil Chemical, Houston, Texas)
[7]Sylvarez ZT 105LT styrenated terpene resins (Arizona Chemical Co., Panama City, Florida)
[8]Rextac RT-2730 amorphous polyalphaolefin (Huntsman, Houston, Texas)
[9]Butyl 065 isobutylene-isoprene copolymer (Exxon Chemical Co., Houston, Texas)
[10]Kaneka Epion 800S silyl terminated polyisobutylene (Kaneka Corp., Tokyo, Japan)
[11]Indopol H-1900 polybutene (BP, Naperville, Illinois)

TABLE 5

|  |  | 7 | 8 | 9 | 10 | 11 | 12 | 13 | 14 | 15 |
|---|---|---|---|---|---|---|---|---|---|---|
| Initial Lap Shear (green strength) (psi) | | NT | NT | NT | NT | NT | 40 | 17 | 9 | 17 |
| Lap shear strength after 24 hours at 23° C. and 50% Relative Humidity (psi) | | 100 | 44 | 15 | 40 | 23 | NT | NT | NT | NT |
| Lap shear strength after 2 weeks at 23° C. and 50% Relative Humidity (psi) | | 150 | 102 | 32 | 62 | 43 | 62 | 66 | 58 | 57 |
| Lap shear strength after 1 week of −40° F. to 160° F. temperature cycling** (psi) | | NT | 78 | 32 | 96 | 48 | NT | NT | NT | 84 |
| Lap shear strength after 2 weeks at 140° F. and 100% Relative Humidity (psi) | | NT | NT | NT | NT | NT | 205 | 230 | 251 | NT |
| Uncured Composition | Softening T (° C.) | NT | NT | NT | NT | NT | 35 | 27 | 13 | 39 |
| | Open time (sec) | NT | NT | NT | NT | NT | 25 | 350 | 700 | 80 |
| | Tg (° C.) | NT | NT | NT | NT | NT | −29 | −40 | −40 | −41 |
| Cured Composition | Modulus at 100% Elongation (psi) | 428 | 219 | NT | 183 | NT | 252 | 219 | 200 | 104 |
| | Tensile strength (psi) | 554 | 226 | NT | 184 | 96 | 358 | 370 | 381 | 187 |
| | Elongation (%) | 371 | 242 | NT | 97 | 66 | 419 | 372 | 372 | 604 |

**Lap shear bonds were pre-conditioned for two weeks at 23° C. and 50% relative humidity prior to the specified conditioning.

While numerous embodiments and examples have been disclosed herein, it should be apparent that modifications can be made without departing from the spirit and scope of the invention. Therefore, the appended claims are intended to cover all such modifications that are within the scope of this invention. The relevant portions of all documents disclosed herein are hereby incorporated by reference in their entirety.

Other embodiments are within the claims.

What is claimed is:

1. A moisture curable hot melt sealant composition comprising:
   polyurethane prepolymer comprising silane functional groups;
   reactive plasticizer capable of reacting with at least one of said polyurethane prepolymer and itself; and
   thermoplastic polymer.

2. The sealant composition of claim 1, wherein said polyurethane prepolymer further comprises isocyanate functional groups.

3. The sealant composition of claim 1, wherein said polyurethane prepolymer comprises the reaction product of
   polyester polyol;
   polyisocyanate;
   monofunctional alcohol having from 12 to 20 carbon atoms; and
   hydrogen active organofunctional silane.

4. The sealant composition of claim 3, wherein said hydrogen active organofunctional silane comprises aminoalkoxysilane, mercapto-alkoxysilane, or a combination thereof.

5. The sealant composition of claim 3, wherein said hydrogen active organofunctional silane comprises N-methyl-3-amino-2-methylpropyltrimethoxysilane, N-ethyl-3-amino-2-methylpropyltrimethoxysilane, N-ethyl-3-amino-2-methylpropyldiethoxysilane, N-ethyl-3-amino-2-methylpzopyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy)propyltrimethoxysilane, N-ethyl-4-amino-3,3-dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N-(n-butyl) aminopropyltrimethoxysilane, or a combination thereof.

6. The sealant composition of claim 3, wherein said monofunctional alcohol has from 12 to 16 carbon atoms.

7. The sealant composition of claim 1, wherein said reactive plasticizer comprises silyl-terminated polyether.

8. The sealant composition of claim 1, wherein said reactive plasticizer comprises alkoxysilyl reactive groups.

9. The sealant composition of claim 1, wherein said reactive plasticizer is selected from the group consisting of aldimines, ketimines, oxazolidines, dioxolanes, and combinations thereof.

10. The sealant composition of claim 1, wherein said reactive plasticizer has a molecular weight of from about 300 g/mole to about 10,000 g/mole.

11. The sealant composition of claim 1, wherein said reactive plasticizer has a molecular weight of from about 500 g/mole to about 6,000 g/mole.

12. The sealant composition of claim 1, comprising
from about 5% by weight to about 50% by weight said polyurethane prepolymer,
from no greater than 20% by weight said reactive plasticizer, and
from about 5% by weight to about 80% by weight said thermoplastic polymer.

13. The sealant composition of claim 1, comprising
from about 10% by weight to about 40% by weight said polyurethane prepolymer,
from about 2% by weight to about 15% by weight said reactive plasticizer, and
from about 10% by weight to about 70% by weight said thermoplastic polymer.

14. The sealant composition of claim 1, comprising
from about 15% by weight to about 35% by weight said polyurethane prepolymer,
from about 3% by weight to about 10% by weight said reactive plasticizer, and
from about 15% by weight to about 60% by weight said thermoplastic polymer.

15. The sealant composition of claim 1, wherein said composition exhibits an initial lap shear of at least 10 psi.

16. The sealant composition of claim 1, wherein said composition exhibits an open time of at least 60 seconds.

17. The sealant composition of claim 1, wherein said composition exhibits a softening temperature of no greater than 50° C.

18. The sealant composition of claim 1, wherein said sealant composition exhibits a glass transition temperature of less than −5° C.

19. The sealant composition of claim 1, wherein said sealant composition exhibits a glass transition temperature of less than −25° C.

20. The sealant composition of claim 1, wherein said composition exhibits a viscosity of from about 150,000 centipoise to about 400,000 centipoise at 230° F.

21. The sealant composition of claim 1, wherein said composition exhibits a lap shear of at least 80 psi after three weeks at 23° C and 50% relative humidity.

22. The sealant composition of claim 1, wherein said composition, after cure, exhibits an elongation of at least 200%.

23. The sealant composition of claim 1, wherein said composition, after cure, exhibits a tensile strength of at least 100 psi.

24. The sealant composition of claim 1, wherein said composition, after cure, exhibits a modulus at 100% elongation of no greater than 300 psi.

25. The sealant composition of claim 1, wherein said composition, when in the form of a cured 60 mil film, exhibits a moisture vapor transmission rate no greater than 10 g/m$^2$/day.

26. The sealant composition of claim 1 further comprising tackifying agent.

27. The sealant composition of claim 1 further comprising non-reactive plasticizer.

28. The sealant composition of claim 1 further comprising silane adhesion promoter.

29. The sealant composition of claim 1, wherein said thermoplastic polymer comprises ethylene vinyl acetate.

30. The sealant composition of claim 1, wherein said thermoplastic polymer is selected from the group consisting of polyolefins, polyalphaolefins, polyesters, polyacrylates, polymethacrylates, polyacrylamides, polyacrylonitriles, polyimides, polyamides, copolymers of vinyl alcohol and ethylenically unsaturated monomers, polyvinyl chloride, polysiloxanes, polyurethanes, polystyrene, and combinations thereof.

31. The sealant composition of claim 1, wherein said thermoplastic polymer comprises thermoplastic elastomer selected from the group consisting of polyetheramide copolymers, styrene-butadiene copolymers, styrene-butadiene-styrene copolymers, styrene-isoprene-styrene copolymers, styrene-ethylene-butylene-styrene copolymers, styrene-ethylene-propylene-styrene copolymers, butyl rubber, polyisobutylene, isobutylene-isoprene copolymers, and combinations thereof.

32. A moisture curable hot melt sealant composition comprising:
moisture curable polymer comprising silane functional groups;
reactive plasticizer capable of reacting with at least one of said moisture curable polymer and itself; and
thermoplastic polymer.

33. A moisture curable hot melt sealant composition comprising:
polyurethane prepolymer comprising isocyanate functional groups, silane functional groups, or a combination thereof,
said polyurethane prepolymer comprising the reaction product of
polyester polyol,
polyisocyanate,
monofunctional alcohol having from 12 to 20 carbon atoms, and
hydrogen active organofunctional silane;
reactive plasticizer capable of reacting with at least one of said polyurethane prepolymer and itself; and
thermoplastic polymer.

34. The sealant composition of claim 33, wherein said hydrogen active organofunctional silane comprises amino-alkoxysilane, mercapto-alkoxysilane, or a combination thereof.

35. The sealant composition of claim 33, wherein said hydrogen active organofunctional silane comprises N-methyl-3-amino-2-methylpropyltrimethoxysilane, N-ethyl-3-amino-2-methylpropyltrimethoxysilane, N-ethyl-3-amino-2-methylpropyldiethoxysilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy)propyltrimethoxysilane, N-ethyl-4-amino-3,3-dimethylbutyldimethoxymethylsilane, N-ethyl-4-amino-3,3-dimethylbutyltrimethoxysilane, bis-(3-triethoxysilyl-2-methylpropyl)amine, N-(3'-trimethoxysilylpropyl)-3-amino-2-methylpropyltrimethoxysilane, N-(n-butyl)aminopropyltrimethoxysilane, or a combination thereof.

36. The sealant composition of claim 33, wherein said monofunctional alcohol has from 12 to 16 carbon atoms.

37. A moisture curable hot melt sealant composition comprising:

polyurethane prepolymer comprising isocyanate functional groups, silane functional groups, or a combination thereof;

reactive plasticizer capable of reacting with at least one of said polyurethane prepolymer and itself, said reactive plasticizer comprises silyl-terminated polyether; and thermoplastic polymer.

38. A moisture curable hot melt sealant composition comprising:

polyurethane prepolymer comprising isocyanate functional groups, silane functional groups, or a combination thereof;

reactive plasticizer capable of reacting with at least one of said polyurethane prepolymer and itself, said reactive plasticizer comprises alkoxysilyl reactive groups; and thermoplastic polymer.

39. A moisture curable hot melt sealant composition comprising:

polyurethane prepolymer comprising isocyanate functional groups, silane functional groups, or a combination thereof;

reactive plasticizer capable of reacting with at least one of said polyurethane prepolymer and itself; and thermoplastic polymer, said composition exhibiting a viscosity of from about 150,000 centipoise to about 400,000 centipoise at 230° F.

40. A moisture curable hot melt sealant composition comprising:

polyurethane prepolymer comprising isocyanate functional groups, silane functional groups, or a combination thereof;

reactive plasticizer capable of reacting with at least one of said polyurethane prepolymer and itself; and thermoplastic polymer comprising ethylene vinyl acetate.

41. A moisture curable hot melt sealant composition comprising:

polyurethane prepolymer comprising isocyanate functional groups, silane functional groups, or a combination thereof;

reactive plasticizer capable of reacting with at least one of said polyurethane prepolymer and itself; and thermoplastic polymer comprising thermoplastic elastomer selected from the group consisting of polyetheramide copolymers, styrene-butadiene copolymers, styrene-butadiene-styrene copolymers, styrene-isoprene-styrene copolymers, styrene-ethylene-butylene-styrene copolymers, styrene-ethylene-propylene-styrene copolymers, butyl rubber, polyisobutylene, isobutylene-isoprene copolymers, and combinations thereof.

42. A moisture curable hot melt sealant composition comprising:

polyurethane prepolymer comprising isocyanate functional groups, silane functional groups, or a combination thereof;

from 3% by weight to no greater than 20% by weight reactive plasticizer capable of reacting with at least one of said polyurethane prepolymer and itself; and thermoplastic polymer.

* * * * *

UNITED STATES PATENT AND TRADEMARK OFFICE
CERTIFICATE OF CORRECTION

PATENT NO.    : 6,803,412 B2
DATED         : October 12, 2004
INVENTOR(S)   : Mai T. Nguyen-Misra and Margarita Acevedo It is certified that error appears in the above-identified patent and that said Letters Patent is hereby corrected as shown below:

Column 27,
Line 10, "triethoxysilyl" should read -- trimethoxysilyl --.

Signed and Sealed this

Eleventh Day of January, 2005

JON W. DUDAS
*Director of the United States Patent and Trademark Office*